Patented Sept. 1, 1942

2,294,755

UNITED STATES PATENT OFFICE 2,294,755

RESISTANT BODY HAVING NEGATIVE TEMPERATURE CHARACTERISTIC

Hideo Inutsuka and Shujiro Kawase, Kawasaki, Kanagawa-ken, Japan, assignors to General Electric Company, a corporation of New York No Drawing. Application January 10, 1941, Serial No. 373,988. In Japan February 7, 1940

3 Claims. (Cl. 201—76)

The present invention relates to an electric resistance material having a high negative temperature coefficient of resistance and composed of metallic oxides which are quite stable in the condition where the oxidation has advanced sufficiently.

Heretofore in the manufacture of electric resistance material having a negative temperature coefficient of resistance two or more metallic oxides such as calcium, magnesium, barium, silica, titanium, zirconium, uranium, molybdenum and tungsten generally have been used in combination. The dielectric strength of these materials is however so great in the state in which the oxidation has sufficiently advanced that they are not adapted for use as resistance material at normal temperatures. For instance, titanous oxide (TiO) is a good resistance component but titanic oxide (TiO$_2$) in which the oxidation is further advanced is a better dielectric substance and has a high dielectric strength. Similarly, the aforesaid substances have high dielectric strength where their oxidation has progressed sufficiently. However, in the ordinary resistance bodies consisting of metallic oxides the oxidation thereof has been insufficient, and the material has been placed in a vacuum or inert gas thereby retarding the oxidation even when heated at high temperatures. Moreover, in the process of manufacture they must be treated in a reducing gas.

The resistance material produced according to the present invention may consist of powdered copper oxide (CuO) and powdered chromic oxide (Cr$_2$O$_3$). Such a composition is not affected substantially with respect to its negative coefficient of resistance even after it is heated to high temperatures in air. It should be noted that if the weight of chromic oxide to the total weight is less than 5% it may be difficult to use it as the resistance value thereof is so great. Furthermore, when the content of chromic oxide is more than 40% not only does it require a high heating temperature but the quality thereof is inferior. It is preferable therefore to employ a content of chromic oxide between about 5% to 40% of the total content of the resistor. The sintering temperature employed is preferably about 1000 to 1500° C. though it may vary according to the content of chromic oxide, the dimension of resistance material, and the method of treatment.

As an example about 90% by weight copper oxide powder is mixed with about 10% by weight chromic oxide powder and ball milled for about 20 to 30 hours. A binder such as paraffin is then added to and mixed with the ingredients and the resultant mixture pressed into any desired form and baked or sintered in an electrical furnace. In sintering the mixture it is preferable to increase the temperature gradually, for example, raising it at the rate of about 200° C. per hour to thereby drive out the paraffin and then raising it at the rate of about 50° C. per hour when it attains a temperature about 100° C. below the finishing temperature, for example 1100° C. Sintering the mixture in this way provides an extremely good resistance material having a satisfactory negative-temperature coefficient of resistance, and a resistance varying from about 50 ohms to 100,000 ohms. The sintering temperatures and time required may of course be determined according to the dimension of resistance bodies, and the resistance may vary according to the chromic oxide content and also the size of the body. If desired metallic copper itself may be comminuted and added to chromic oxide powder. After ball milling the mixture it is formed into desired forms by adding a proper binder, and then finished by sintering it at 1050° C. for two hours. The resulting product is only slightly porous. In either of the aforesaid instances the chromic oxide may be replaced in whole or in part by ferric oxide to obtain an equally good resistance body.

The resistance body thus formed may be heated at high temperatures in air without affecting the negative coefficient of resistance of the body. We have measured the resistance value of the product by heating it in the atmosphere up to 500° C. and then cooling it down and found no variation at all with respect to the value of the negative temperature coefficient of resistance.

The product made in this way has a high resistance at room temperature but its value decreases considerably as the temperature rises. It may be used therefore not only as a temperature relaying member but also as a relaying means which operates with a definite time delay after impressing a voltage thereon, such means preventing an abrupt flow of current when the circuit is closed, as the temperature rises due to Joule's law with flow of current when a given voltage is impressed and the current value increases gradually. Since the voltage drop across such resistant body is not affected substantially by variation of the supply voltage the resistance may be used in combination with means for obtaining a normal voltage. The resistance according to the present invention also has extremely good electric characteristics.

What we claim as new and desire to secure by Letters Patent of the United States, is:

1. A sintered metallic composition having a negative temperature coefficient of resistance, said composition containing 95% to 60% by weight of copper oxide (CuO) the remainder consisting of 5% to 40% by weight of material from a group consisting of ferrous oxide and chromic oxide, said composition being characterized by its substantial freedom from porosity and by its substantial freedom from change with respect to negative temperature coefficient of resistance after having been heated to high temperatures.

2. A sintered metallic composition having a negative temperature coefficient of resistance and containing 95% to 60% by weight of copper oxide (CuO) with the remainder 5% to 40% chromic oxide, said composition being characterized by its substantial freedom from porosity and by its substantial freedom from change with respect to negative temperature coefficient of resistance after having been heated to high temperatures.

3. A sintered resistant body consisting of 90% copper oxide (CuO) and 10% chromic oxide said body being characterized by its substantial freedom from porosity and by its substantial freedom from change with respect to negative temperature coefficient of resistance after having been heated to high temperatures.

HIDEO INUTSUKA.
SHUJIRO KAWASE.